UNITED STATES PATENT OFFICE.

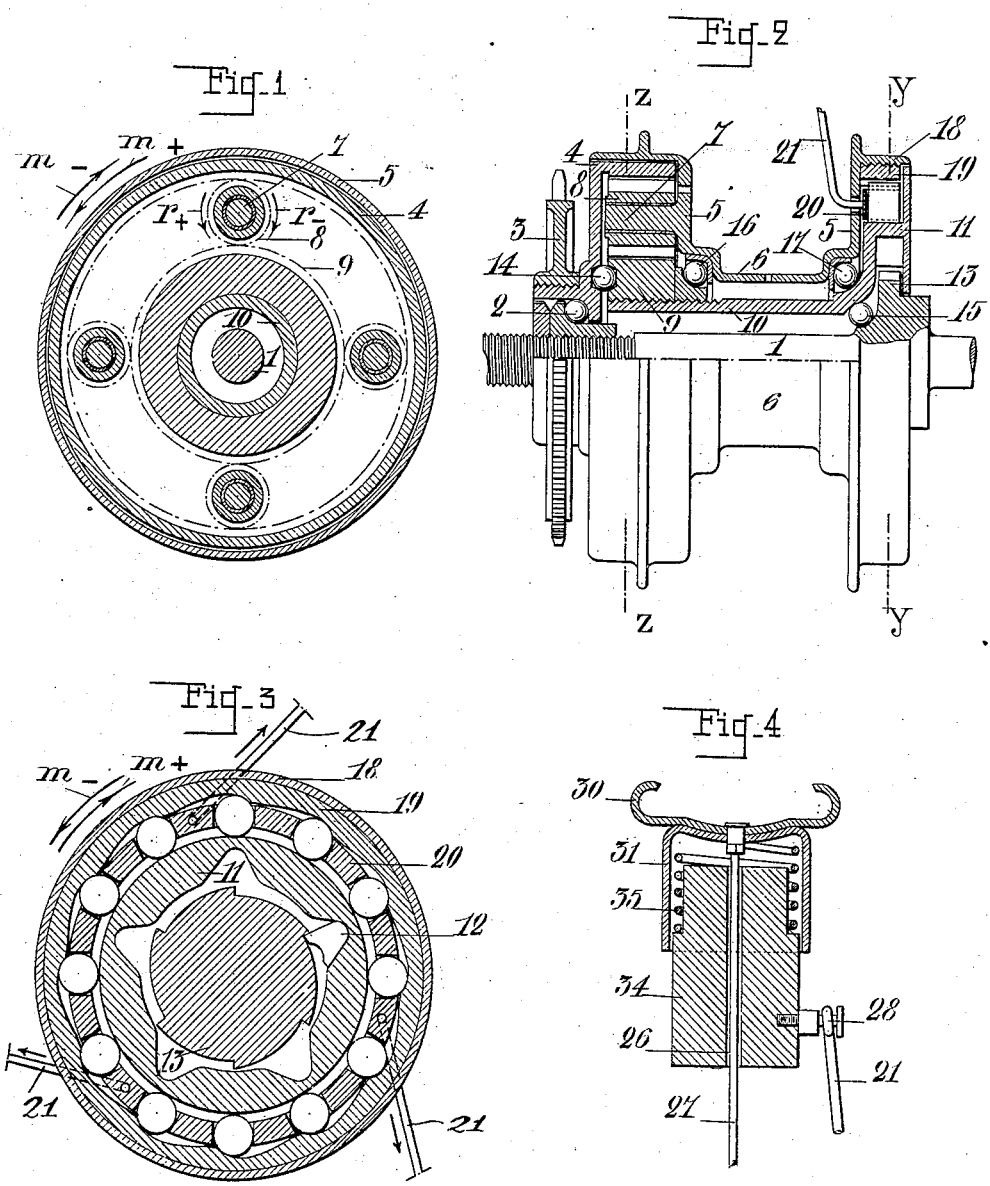

LOUIS BADOIS, OF PARIS, FRANCE.

AUTOMATIC CHANGE-SPEED GEARING.

No. 918,258.  Specification of Letters Patent.  Patented April 13, 1909.

Application filed June 3, 1907. Serial No. 376,915.

*To all whom it may concern:*

Be it known that I, LOUIS BADOIS, a citizen of France, residing at Paris, in the said Republic, have invented new and useful Improvements in and Connected with Automatic Change - Speed Gearing; and I do hereby declare the following to be a full, clear, and exact description of the same.

This invention relates to improvements in and connected with automatic change speed gear, whereby the change of the gears to give the different speeds is effected automatically by the antagonistic action of spring and centrifugal force.

The invention is especially applicable to the case where it is desirable to employ a single wheel on the driving shaft to communicate different speeds to the driven shaft. For this purpose, the invention consists in transmitting the motion of the driving shaft to the driven shaft, through a system of toothed gearing and suitable free wheel, or one way clutch mechanism, so adapted that the driven shaft is moved by one or the other means of transmission, according to the actual speed of said shaft, the change of speed being effected automatically.

The invention also consists in adopting the clutch mechanism to permit the driven shaft to rotate freely when the driver shaft is arrested, viz. " free wheeling " in the application to a cycle, said free wheeling being further possible for each speed of the driven shaft.

The accompanying drawings illustrate by way of example applications of the invention to change speed gears with two speeds.

In these drawings: Figure 1 is a transverse sectional elevation along the line $z\ z$ of the Fig. 2. Fig. 2 is an elevation half in longitudinal section. Fig. 3 is a transverse sectional elevation along the line $y\ y$ of the Fig. 2. Fig. 4 is a detail view showing the mode of mounting the heavy regulating masses, in the case of a change speed with two speeds.

Similar reference numerals designate similar parts in the several figures.

In carrying out the invention according to the mode indicated in Figs. 1—3, viz. in the application to a cycle with two speeds, the usual single chain driven sprocket pinion, 3, is mounted so as to rotate freely on ball bearings, 2, on a stationary shaft or spindle, 1. The sprocket pinion is secured to an internally toothed or annular wheel, 4, which meshes with pinions, 8, mounted loosely on pins, 7, fixedly carried by the hub 5—6 of the road wheel. The pinions, 8, also mesh with a sun wheel, 9, rigidly mounted on a sleeve, 10, which can rotate freely on ball bearings, 14, 15, in relation to the stationary shaft or spindle, 1, but which can be secured to the said shaft under certain conditions hereinafter specified. At the end of the sleeve, 10, opposite to the wheel, 9, one part, *i. e.* the outer annular part, 11, of a one way clutch is formed, the inner corresponding part, 13, being formed or fixedly mounted on the stationary shaft or spindle, 1. This clutch is preferably of the rocking ratchet type, that is, the inner fixed portion, 13, is in the form of a ratchet wheel, and the outer portion 11, has recesses for receiving rocking pawls, 12, adapted to slip over the ratchet wheel 13, in one direction and to engage in the other. The hub, 5—6, of the road wheel is mounted on ball bearings, 16, 17, so that it is free to rotate on the sleeve, 10, before referred to, under certain conditions. At the end, 18, of the hub 5—6, the outer part 19, of a ball or roller clutch is formed or mounted, and between this part and the smooth outer periphery of the outer part, 11, of the first mentioned clutch, the ball or roller cage, 20, and balls or rollers of the second clutch are situated. This cage, 20, is adapted to be held stationary relatively to the hub, 5—6, at low speed by an automatic spring and centrifugal device of the following kind. A rod or pin, 21, is controlled by an automatic device established as follows (Fig. 4). The rod 21 is articulated at 28 on a regulating heavy mass 34, sliding into a cylinder 31 secured on the rim 30. The said mass is combined with a spring 35 located in the cylinder 31 and bearing against the bottom of the latter and the top of the mass 34. This mass is provided with a central hole 26 and can slide along a spoke 27 of the wheel, said spoke acting as a guide for the said mass. The rod 21 projects through a hole in the hub and enters a hole in the cage, 20, as long as the speed is low, but at high speed the pin is automatically withdrawn. The clutch is such that the balls or rollers of the cage, 20, slip or run free when the cage is held by the pin, 21, but engage or lock when the cage is released by the automatic withdrawal of the pin. The other clutch, 11, 12, 13, is so arranged that at low speed it locks and holds the sun wheel, 9, stationary, but at high speed runs free to release the sleeve, 10, which is then clutched to the hub, 5—6, by the other clutch.

When the wheel, 4, turns slowly in the direction indicated by the arrow, $m^+$, the pinions, 8, turn on their axes in the direction indicated by the arrow, $r^*$, and rotate the wheel, 9, slightly, in the direction, $m^-$, and, at the same time, the piece, 11, whereby the wheel, 9, is clutched on the fixed shaft, 1; the sun wheel, 9, being held stationary, the hub, 5—6, will be driven in the direction, $m^-$, through the intermediary of the epicyclic gearing, 4—8.

If it is desired to free-wheel, the sprocket pinion, 3, is arrested while the hub, 5—6, still rotates under the momentum of the cycle. The annular wheel 4, being held stationary, the pinions, 8, rotate in a reverse direction $r^-$, on their own axes and rotate the sun wheel, 9, in the same direction, $m^+$, as the hub, so that the ratchet clutch, 11, 12, 13, runs free, and the hub, 5—6, the sun wheel, 9, the sleeve, 10, and the outer part, 11, of the ratchet clutch all rotate freely around the shaft 1 the rollers or balls in the other clutch being inoperative.

When a sufficiently high speed is attained to cause the centrifugal device to withdraw the pin, 21, and release the ball or roller cage, 20, the balls or rollers of the latter engage and lock the part, 11, of the clutch to the part 19, that is, lock the hub, 5—6, to the sleeve, 10, and consequently the sprocket pinion, 3, the pinions, 8, the sleeve, 10, and the hub, 6, all rotate *en bloc*, the inner clutch, 11, 12, 13, simply running free.

To free-wheel when at high speed, the sprocket pinion 3, is arrested, with the result that as at low speed, the sleeve, 10, and the clutch member, 11, thereon rotate in the ahead direction, thereby tending to unlock the ratchet clutch, 13. The balls of the other clutch automatically run free, hence the hub, 5—6, is free to rotate in the ahead direction, as also is the sleeve, 10, but the former not so quickly as the latter.

Having now particularly described my invention, I declare that what I claim is:—

A change speed apparatus with automatic regulation for transmission for different speeds, comprising a driven shaft (6), a single driving wheel (3) normally loose in relation to the driven shaft, an intermediate transmission mechanism comprising pinions (8) constantly in engagement with the toothed wheel, a toothed wheel (9) loose in relation to the driven shaft and coacting with said pinions, a ratchet and pawl mechanism comprising on the one hand, an outer part (11) attached to the toothed wheel (9) and pawls (12) supported thereby, and, on the other hand, a fixed shaft (1), a ratchet (13) secured thereto, a wedge clutch having an outer part (19), attached to the driven shaft (6), friction rollers resting on the smooth exterior surface of the outer part (11) of the aforesaid ratchet and pawl mechanism (13—12), a cage (20) embracing said friction rollers, a regulating device consisting of weighty masses (34) carried by and movable in relation to the driven shaft, springs (35) opposing said masses, and rods (21) connecting said masses with the cage (20) aforesaid.

In testimony whereof, I have signed my name to this specification in the presence of two subscribing witnesses.

LOUIS BADOIS.

Witnesses:
 ANDRÉ BORDILLON,
 EUGÈNE PICHON.